United States Patent
Nagasaka (10) Patent No.: US 12,525,042 B2
(45) Date of Patent: Jan. 13, 2026

(54) IMAGE ANALYSIS METHOD, IMAGE ANALYSIS DEVICE AND COMPUTER PROGRAM FOR IMPLEMENTING IMAGE ANALYSIS METHOD

(71) Applicant: Toru Nagasaka, Nagoya (JP)

(72) Inventor: Toru Nagasaka, Nagoya (JP)

(*) Notice: Subject to any disclaimer, the term of this patent is extended or adjusted under 35 U.S.C. 154(b) by 297 days.

(21) Appl. No.: 18/566,374

(22) PCT Filed: Jun. 4, 2021

(86) PCT No.: PCT/JP2021/021455
§ 371 (c)(1),
(2) Date: Dec. 1, 2023

(87) PCT Pub. No.: WO2022/254726
PCT Pub. Date: Dec. 8, 2022

(65) Prior Publication Data
US 2024/0249541 A1    Jul. 25, 2024

(51) Int. Cl.
*G06V 20/69* (2022.01)
*G06T 7/70* (2017.01)
*G06V 10/82* (2022.01)

(52) U.S. Cl.
CPC .............. *G06V 20/698* (2022.01); *G06T 7/70* (2017.01); *G06V 10/82* (2022.01);
(Continued)

(58) Field of Classification Search
CPC .. G06V 20/698; G06V 10/82; G06V 2201/03; G06V 20/695; G06T 7/70;
(Continued)

(56) References Cited

U.S. PATENT DOCUMENTS

| 12,140,545 B2 * | 11/2024 | Nakamura | ................ G06T 5/90 |
| 2004/0115659 A1 * | 6/2004 | Geiger | ................... C07K 14/47 |
| | | | 435/6.16 |

(Continued)

FOREIGN PATENT DOCUMENTS

| JP | 2011186750 A | 9/2011 |
| JP | 2011527056 A | 10/2011 |

(Continued)

OTHER PUBLICATIONS

International Search Report and Written Opinion for corresponding International PCT Application No. PCT/JP2021/021455; dated Aug. 17, 2021. (English translation included).

(Continued)

*Primary Examiner* — Wesley J Tucker
(74) *Attorney, Agent, or Firm* — K&L Gates LLP (57) ABSTRACT

An image analysis method includes a calculation unit that calculates a colocalization value indicating colocalization between two target cell objects among a plurality of target cell objects and an output unit that outputs output data acquired by using the colocalization value to an external, wherein the calculation unit calculates the colocalization value by using a first calculation that includes multiplying a first matching rate specified for a first target cell object and a second matching rate specified for a second target cell object and a second calculation that includes dividing a calculated value acquired by the first calculation by first distance squared, the first distance being a distance between the first target cell object and the second target cell object.

6 Claims, 7 Drawing Sheets

(52) U.S. Cl.
CPC ............... *G06T 2207/20084* (2013.01); *G06T 2207/30024* (2013.01); *G06V 2201/03* (2022.01)

(58) Field of Classification Search
CPC . G06T 2207/20084; G06T 2207/30024; G06T 2207/10056; G06T 7/0012; G16H 40/67; G16H 50/70; G16H 30/40
See application file for complete search history.

(56) References Cited

U.S. PATENT DOCUMENTS

| | | | | |
|---|---|---|---|---|
| 2005/0266395 | A1* | 12/2005 | Gholap | G06V 10/46 702/19 |
| 2016/0108108 | A1* | 4/2016 | Wang | A61K 31/69 514/17.7 |
| 2017/0350805 | A1* | 12/2017 | Murata | G01N 21/27 |
| 2019/0376879 | A1* | 12/2019 | Reichen | G01N 15/1459 |
| 2020/0043159 | A1* | 2/2020 | Watanabe | G06V 20/698 |
| 2020/0309671 | A1* | 10/2020 | Lin | G06T 7/136 |
| 2023/0303700 | A1* | 9/2023 | Lee | C07K 16/2818 |
| 2023/0349803 | A1* | 11/2023 | Miklosi | A61K 40/42 |
| 2024/0294973 | A1* | 9/2024 | Wang | C12Q 1/6841 |
| 2025/0251402 | A1* | 8/2025 | Dubach | G01N 33/533 |

FOREIGN PATENT DOCUMENTS

| | | |
|---|---|---|
| JP | 2012-223104 A | 11/2012 |
| JP | 2020-047190 A | 3/2020 |
| WO | 2010003043 A2 | 1/2010 |

OTHER PUBLICATIONS

Shivanandan et al. BMC Bioinformatics 2013.
Helmuth et al. BMC Bioinformatics 2010.
Lagache, Thibault et al., Statistical Analysis of Molecule Colocalization in Bioimaging, Cytometry Part A, vol. 87A, No. 6 Jun. 2015, International society for advancement of cytometry, Jan. 20, 2015, pp. 568-579 Whole document.
Japanese Office Action for corresponding Japan Patent Application No. 2023-525342 mailed on Nov. 26, 2024.
Written Opinion of the International Searching Authority for corresponding International Application No. PCT/JP2021/021455, mailed Aug. 17, 2021 (English Translation Provided).
European Search Report for corresponding EP application No. 21944219.1 mailed on Feb. 12, 2025.
Arnol et al., "Modeling Cell-Cell Interactions from Spatial Molecular Data with Spatial Variance Component Analysis", Cell Reports, vol. 29, No. 1, Oct. 31, 2019, pp. 202-211.
Costes et al., "Automatic and Quantitative Measurement of Protein-Protein Colocalization in Live Cells", Biophysical Journal, vol. 86, No. 6, Jun. 30, 2004, pp. 3993-4003.
Aaron et al., "Image co-localization—co-occurrence versus correlation", Journal of Cell Science, vol. 131, No. 3, Feb. 28, 2018.
Mascalchi et al., "Which Elements to Build Co-localization Workflows? From Metrology to Analysis: Methods and Protocols" In: "Computer Optimized Microscopy: Methods and Protocols", vol. 2040, Jan. 31, 2019, pp. 177-213.
Helmuth et al., "Beyond co-localization: inferring spatial interactions between sub-cellular structures from microscopy images", BMC Bioinformatics, Biomed Central, London, GB, vol. 11, No. 1, Jul. 7, 2010, p. 372.

* cited by examiner

IMAGE ANALYSIS METHOD, IMAGE ANALYSIS DEVICE AND COMPUTER PROGRAM FOR IMPLEMENTING IMAGE ANALYSIS METHOD

CROSS-REFERENCE TO RELATED APPLICATIONS

This application is a U.S. National Stage Entry under 35 U.S.C. § 371 of International Patent Application No. PCT/JP2021/021455, filed Jun. 4, 2021, entitled IMAGE ANALYSIS METHOD, IMAGE ANALYSIS DEVICE AND COMPUTER PROGRAM FOR IMPLEMENTING IMAGE ANALYSIS METHOD, the entire disclosures of which are hereby incorporated by reference herein.

TECHNICAL FIELD

The present specification discloses image analysis methods for analyzing cell images.

BACKGROUND ART

In recent years, pathological tissue diagnoses or cytological diagnoses using image analysis methods are in practice (e.g., Japanese Patent Application Publication No. 2011-527056). In this technology, image data acquired from a pathological tissue specimen, a cytological specimen, or the like is input to an image analysis device to obtain a cell classification result.

SUMMARY

Solution To Problem

The present specification discloses technologies that not only outputs cell classification but also quantifies colocalization between cells and outputs the same.

An image analysis method disclosed in the present specification may comprise: acquiring cell image data acquired from a living organism; executing an image matching analysis on the cell image data so as to specify a plurality of target cell objects matching any of predetermined one or more types of cells in a cell image represented by the cell image data, wherein in the image matching analysis, for each of the plurality of target cell objects, a position of the target cell object and a matching rate of the target cell object are specified; calculating a colocalization value indicating colocalization between two target cell objects among the plurality of target cell objects; and outputting output data acquired by using the colocalization value to an external, wherein the calculating the colocalization value includes calculating the colocalization value by using a predetermined formula, and the predetermined formula represents: a first calculation including multiplying a first matching rate specified for a first target cell object of the two target cell objects and a second matching rate specified for a second target cell object of the two target cell objects; and a second calculation including dividing a calculated value acquired by the first calculation by first distance squared, the first distance being a distance between a first position specified for the first target cell object and a second position specified for the second target cell object.

According to the configuration above, each of the plurality of target cell objects in the cell image is classified with a matching rate of the target cell object by the image matching analysis. Further, a colocalization value indicating colocalization between two target cell objects is calculated by using the matching rates specified by the image matching analysis, and output data acquired by using the colocalization value is output. Not only the cell classification can be outputted, but also the colocalization between cells can be quantified and outputted. In particular, the colocalization value can be calculated with consideration to a phenomenon that a degree of colocalization between cells changes in inverse proportion to the square of distance.

The other image analysis method disclosed in the present specification may comprise: acquiring cell image data acquired from a living organism; executing an image matching analysis on the cell image data so as to specify a plurality of target cell objects matching any of predetermined one or more types of cells in a cell image represented by the cell image data, wherein in the image matching analysis, for each of the plurality of target cell objects, a position of the target cell object and a matching rate of the target cell object are specified; calculating a colocalization value indicating colocalization between at least three target cell objects among the plurality of target cell objects; and outputting output data acquired by using the colocalization value to an external, wherein the calculating the colocalization value includes calculating the colocalization value by using a predetermined formula, and the predetermined formula represents: a first calculation including multiplying a first matching rate specified for a first target cell object of the at least three target cell objects, a second matching rate specified for a second target cell object of the at least two target cell objects and a third matching rate specified for a third target cell object of the at least three target cell objects; and a second calculation including dividing a calculated value acquired by the first calculation by a first distance, a second distance, and a third distance, the first distance being a distance between a first position specified for the first target cell object and a second position specified for the second target cell object, the second distance being a distance between the second position and a third position specified for the third target cell object, and the third distance being a distance between the third position and the first position.

According to this configuration, not only the colocalization value between two cells but also the colocalization value between three or more cells can be calculated.

Image analysis devices for implementing the above image analysis methods are also novel and useful. Further, a computer program for controlling the image analysis device and a computer-readable medium storing the computer program are also novel and useful.

FIRST EMBODIMENT

Figure 1:
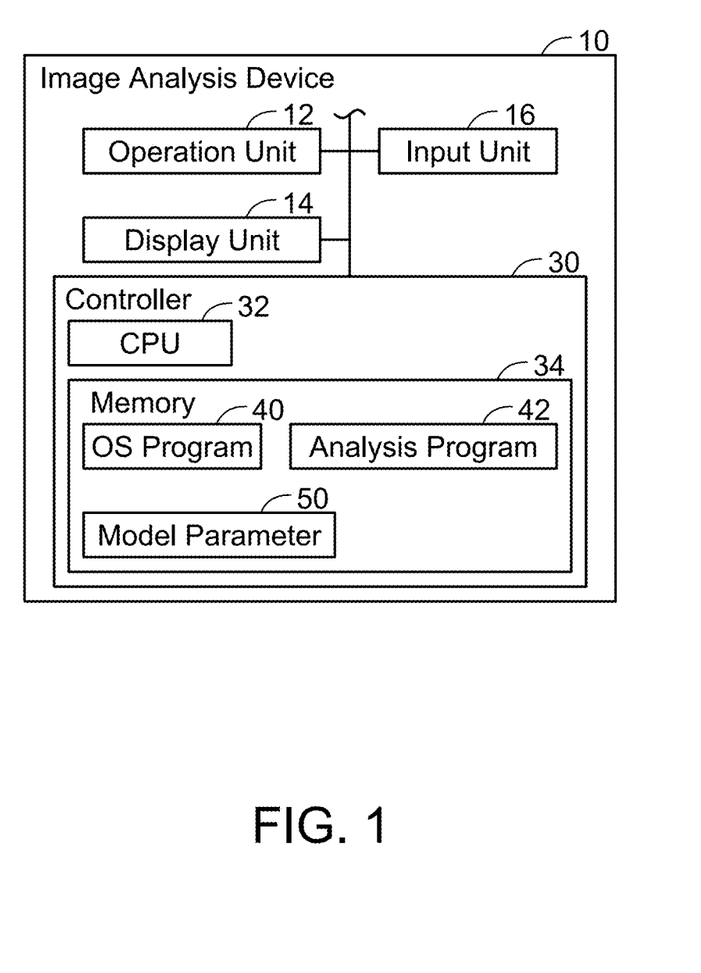
FIG. 1 shows a block diagram of an image analysis device.

Configuration of Image Analysis Device; FIG. 1

FIG. 1 shows a configuration of an image analysis device 10. The image analysis device 10 comprises an operation unit 12, a display unit 14, an input unit 16, and a controller 30. The units 12 to 30 are each connected to a bus line (reference sign omitted). The operation unit 12 comprises, for example, a mouse, a key board, etc. A user can give various instructions to the image analysis device 10 by operating the operation unit 12. The display unit 14 is a display for displaying various information.

The input unit 16 is a device for inputting cell image data which represents a cell image including a plurality of cell objects to the image analysis device 10. The input unit 16 may be a communication interface for wired communication or wireless communication, or a memory interface to which a USB memory or the like is inserted. For example, cell image data may be input to the image analysis device 10 by the input unit 16 executing wired communication or wireless communication with a device that stores cell image data captured by a microscope, Whole Slide Image, virtual slide, or the like and receiving the cell image data from the device. Alternatively, for example, cell image data may be input to the image analysis device 10 by the input unit 16 reading out the cell image data from a memory that stores the cell image data.

The controller 30 comprises a CPU 32 and a memory 34. The CPU 32 executes various processes according to programs 40, 42 stored in the memory 34. The memory 34 stores an OS program 40 for implementing basic operations of the image analysis device 10 and an analysis program 42 for executing image analysis according to a convolutional neural network (hereinafter referred to as "CNN (abbreviation of Convolutional Neural Network)"). The image analysis device 10 is implemented, for example, by installing the analysis program 42 to a general-purpose PC, server, or the like. The image analysis according to the CNN herein is a concept that encompasses image analyses according to large-scale networks (e.g., GoogLeNet (registered trademark), Residual Network, etc.) including the CNN as its partial structure.

The memory 34 further stores CNN model parameters 50 for matching with a plurality of predetermined types of cells (e.g., the lymphocyte, macrophage, carcinoma, etc.). In a variant, the memory 34 may store CNN model parameters 50 for matching with a single predetermined type of cell.

The model parameters 50 are data provided for example by a vendor selling the analysis program 42. The model parameters 50 are stored to the memory 34, for example, when the analysis program 42 is installed. Alternatively, the model parameters 50 may be data that is acquired by updating initial parameters stored to the memory 34 upon the install of the analysis program 42 by machine learning. This machine learning may be carried out by the vendor or the user.

Figure 2:
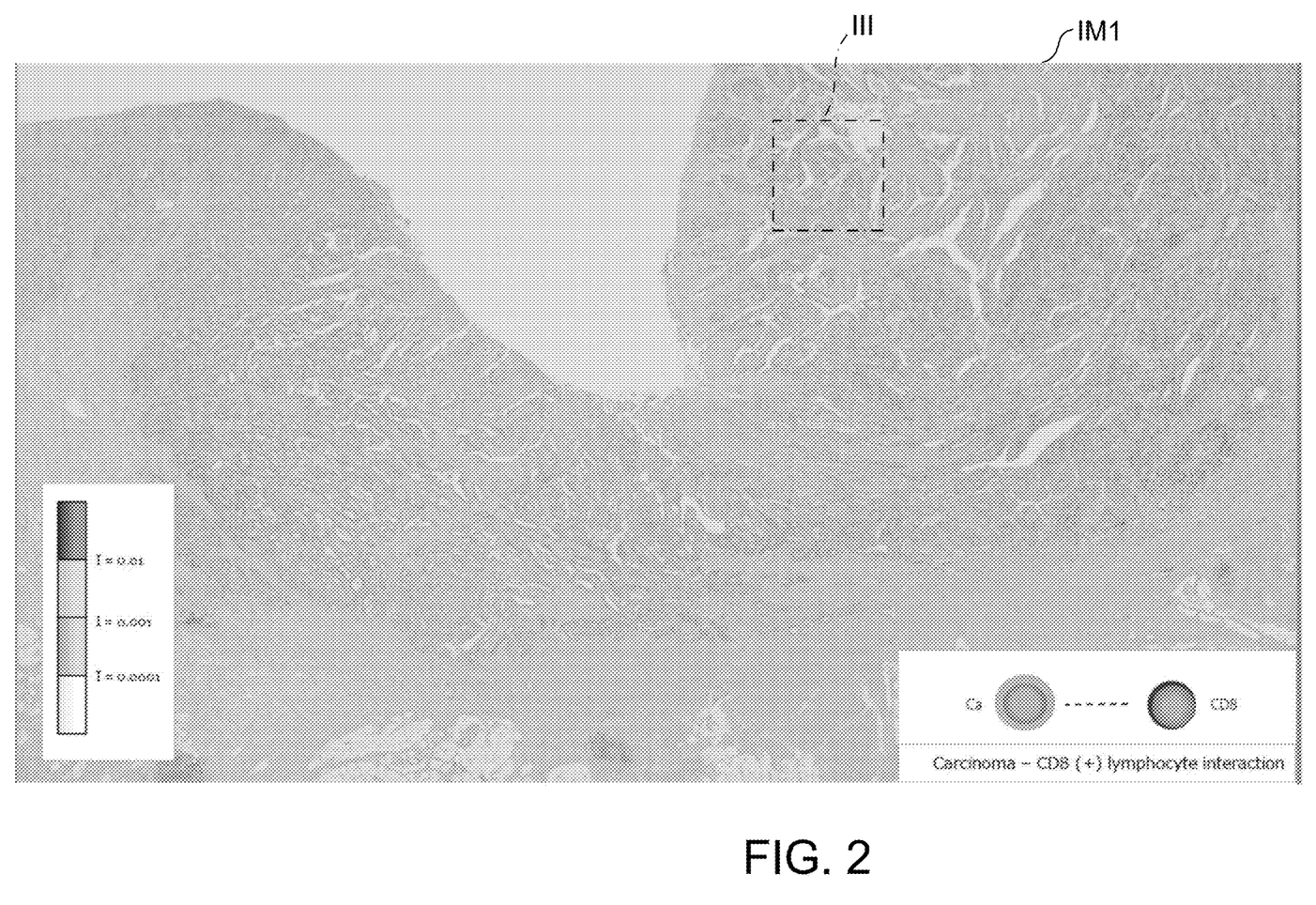
FIG. 2 shows an example of cell image.
Figure 3:
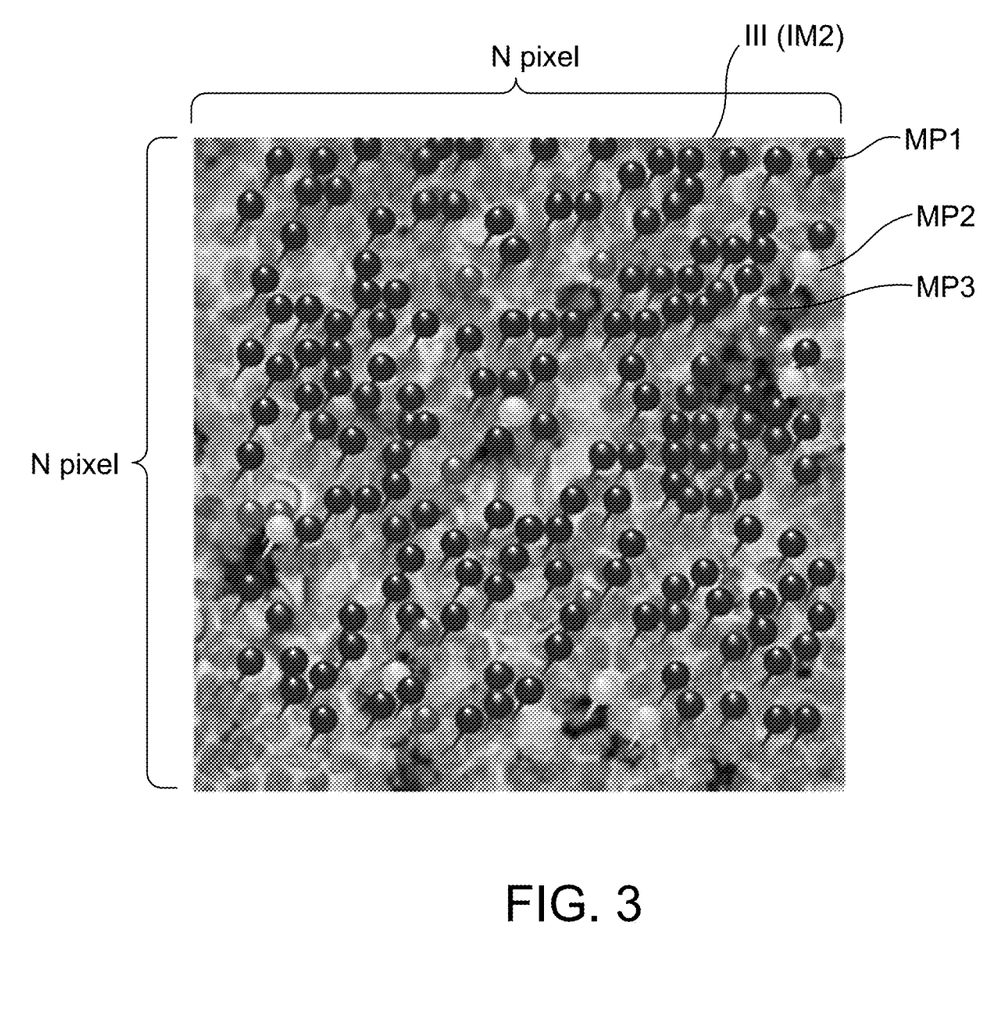
FIG. 3 shows an example of image showing a result of an image matching analysis.
Figure 4:
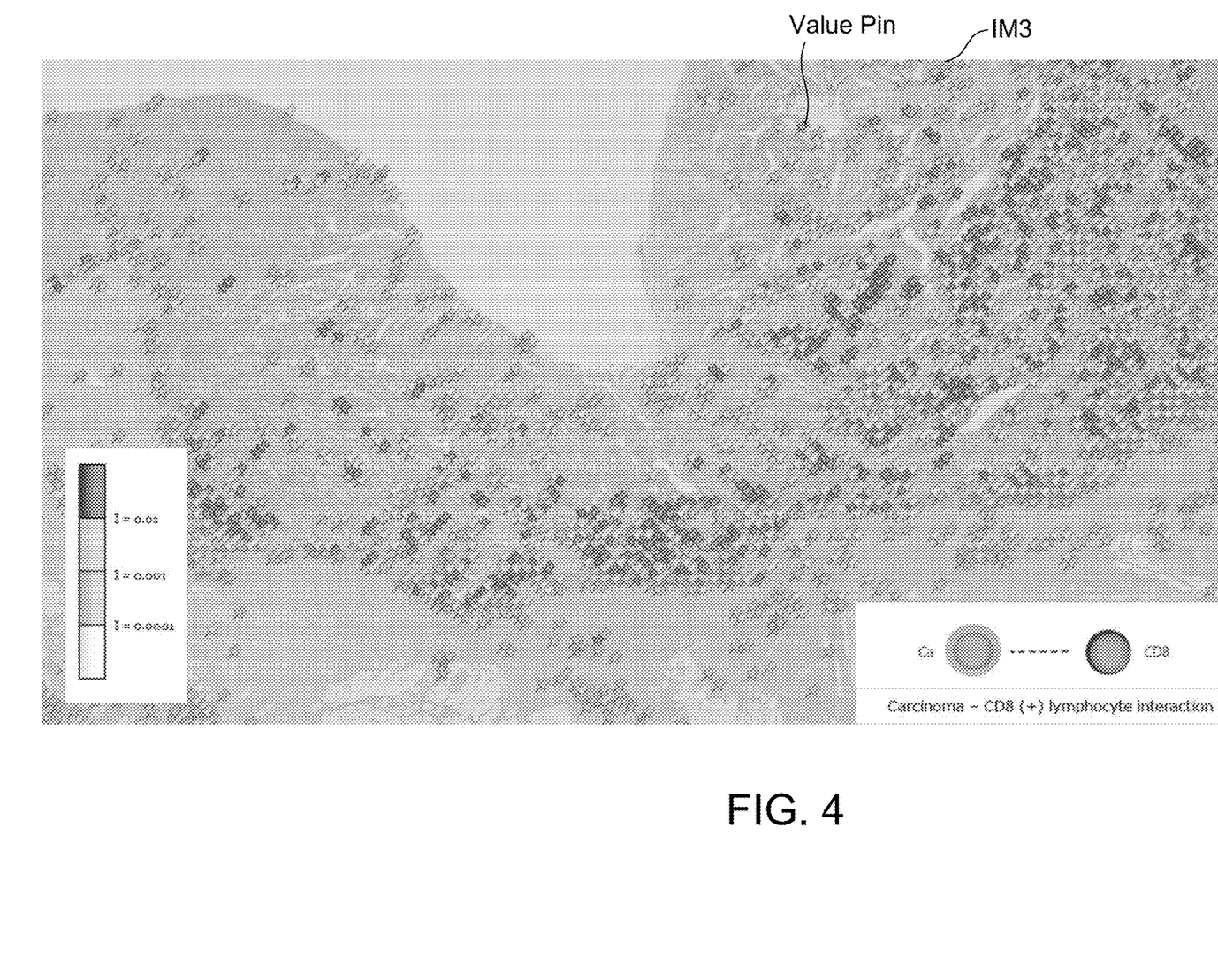
FIG. 4 shows an example of image showing a result of a colocalization analysis.

Image Analysis; FIG. 2 to FIG. 4

Referring to FIG. 2 to FIG. 4, an image analysis method (i.e., an image analysis process) implemented by the CPU 32 according to the analysis program 42 is described. The image analysis method includes a step of executing an image matching analysis and a step of executing a colocalization analysis. The image matching analysis is a process in which the CNN using the model parameters 50 is executed so as to specify M1 target cell objects that match any of the plurality of predetermined types of cells in a cell image represented by cell image data input to the input unit 16. The "M1" indicates an integer equal to or greater than 2. In the image matching analysis, for each of the M1 target cell objects, a position of the target cell object and a matching rate of the target cell object are specified. The matching rate of a target cell object indicates a percentage that a cell represented by the target cell object in the cell image matches any of the plural types of cells. For example, for each of the plural types of cells, a percentage that the cell represented by the target cell object matches the type of cell is calculated, and the greatest percentage among the percentages for the plural types of cells is determined as the matching rate of the target cell object. For example, if a percentage for a first-type cell (e.g., the lymphocyte) is 70%, a percentage for a second-type cell (e.g., image of the macrophage) is 20%, and a percentage for a third-type cell (e.g., image of the carcinoma) is 10%, the matching rate of this target cell object is determined as the greatest percentage 70% for the first-type cell. It should be noted that, for example, if the greatest percentage among plural percentages for plural types of cells does not exceed a predetermined threshold (e.g., 50%), the cell represented by this target cell object may not be specified as any of the plural types of cells.

For example, the CPU 32 executes the image matching analysis on cell image data corresponding to a cell image IM1 shown in FIG. 2. FIG. 3 shows an example of image IM2 showing a result of the image matching analysis on an area indicated by a broken line III in FIG. 2. The image IM2 is displayed by the display unit 14. The image IM2 includes three types of matching pins MP1 to MP3. The matching pins MP1 indicate, for example, target cell objects specified as lymphocytes. It should be noted that in FIG. 3, only one matching pin MP1 among a plurality of matching pins MP1 is labeled and the labeling for the other matching pins MP1 is omitted. Similarly, the labeling is omitted for the matching pins MP2, MP3 as well.

Data corresponding to the matching pins MP1 includes coordinate values that indicate positions of target cell objects indicated by the matching pins MP1 and matching rates of these target object cells. As shown in FIG. 3, the matching pins MP1 are arranged at the positions indicated by the coordinate values in the data corresponding to the matching pins MP1. Data corresponding to respective matching pins MP2, MP3 also include coordinate values and matching rates. For example, the matching pins MP2 indicate target cell objects specified as macrophages, and the matching pins MP3 indicate target cell objects specified as carcinomas.

Subsequent FIG. 4 shows an example of image IM3 showing a result of a colocalization analysis using the result of the image matching analysis. The image IM3 is displayed by the display unit 14. The image IM3 is an image in which a plurality of value pins is superimposed on the cell image IM1 shown in FIG. 2. The value pins each indicate a colocalization value I between M2 target cell objects that are present in an area of interest including the position at which the value pin is arranged. The colocalization values I are values that quantify colocalization between cells. For example, as shown in the lower left part of FIG. 4, the colocalization values I are indicated by colors of the value pins. Value pins with darker colors indicate larger colocalization values I.

For example, the user of the image analysis device 10 can observe the image IM2 shown in FIG. 3 and classify the cells in the specimen shown by the cell image IM1. Further, the user can observe the image IM3 shown in FIG. 4 and distinguish between sites where cells highly probably colocalize and sites where cells are less likely to colocalize in the specimen shown by the cell image IM1. For example, the user can determine presence and absence of intercellular interactions from degrees of colocalization. By displaying the image IM3 as well as the image IM2, the cell classification can be displayed, and also the colocalization between cells can be displayed in a quantified manner. This assists a pathological tissue diagnose or a cytological diagnose by the user.

Figure 5:
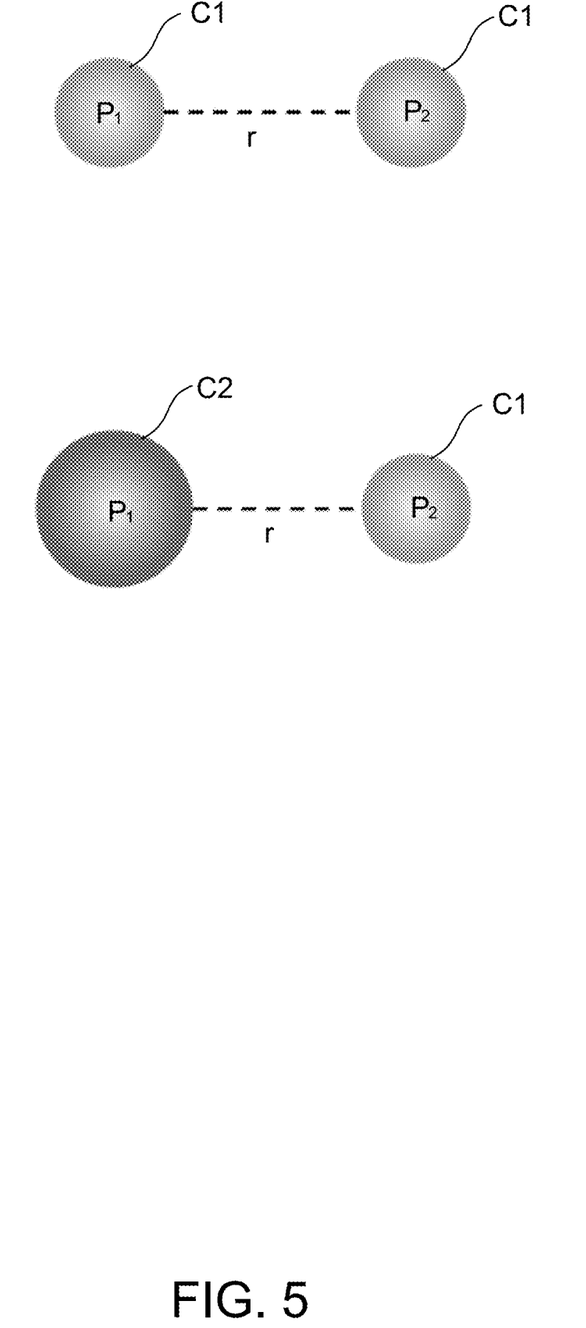
FIG. 5 shows concepts of colocalization between cells.

Concepts of Colocalization between Cells; FIG. 5

The quantification of colocalization between cells is represented by the formula below.

$$I = k_c \frac{P_1 P_2}{r^2} \quad (1)$$

Here, I is a value that quantifies colocalization. $P_1$ is the matching rate of one cell of two cells, and $P_2$ is the matching rate of the other cell of the two cells. $P_1$, $P_2$ are specified by the image matching analysis. r is the distance between the two cells. r is calculated by using coordinate values specified by the image matching analysis. kc is a predetermined coefficient.

As shown in FIG. 5, the two cells may be two cells C1 of the same type. Alternatively, the two cells may be two cells C1, C2 of different types. The cell C1 corresponds to a target cell object determined as matching a first-type cell (e.g., the lymphocyte) among the predetermined plural types of cells in the image matching analysis. The cell C2 corresponds to a target cell object determined as matching a second-type cell (e.g., the carcinoma), which is different from the first-type cell, among the predetermined plural types of cells in the image matching analysis.

Figure 6:
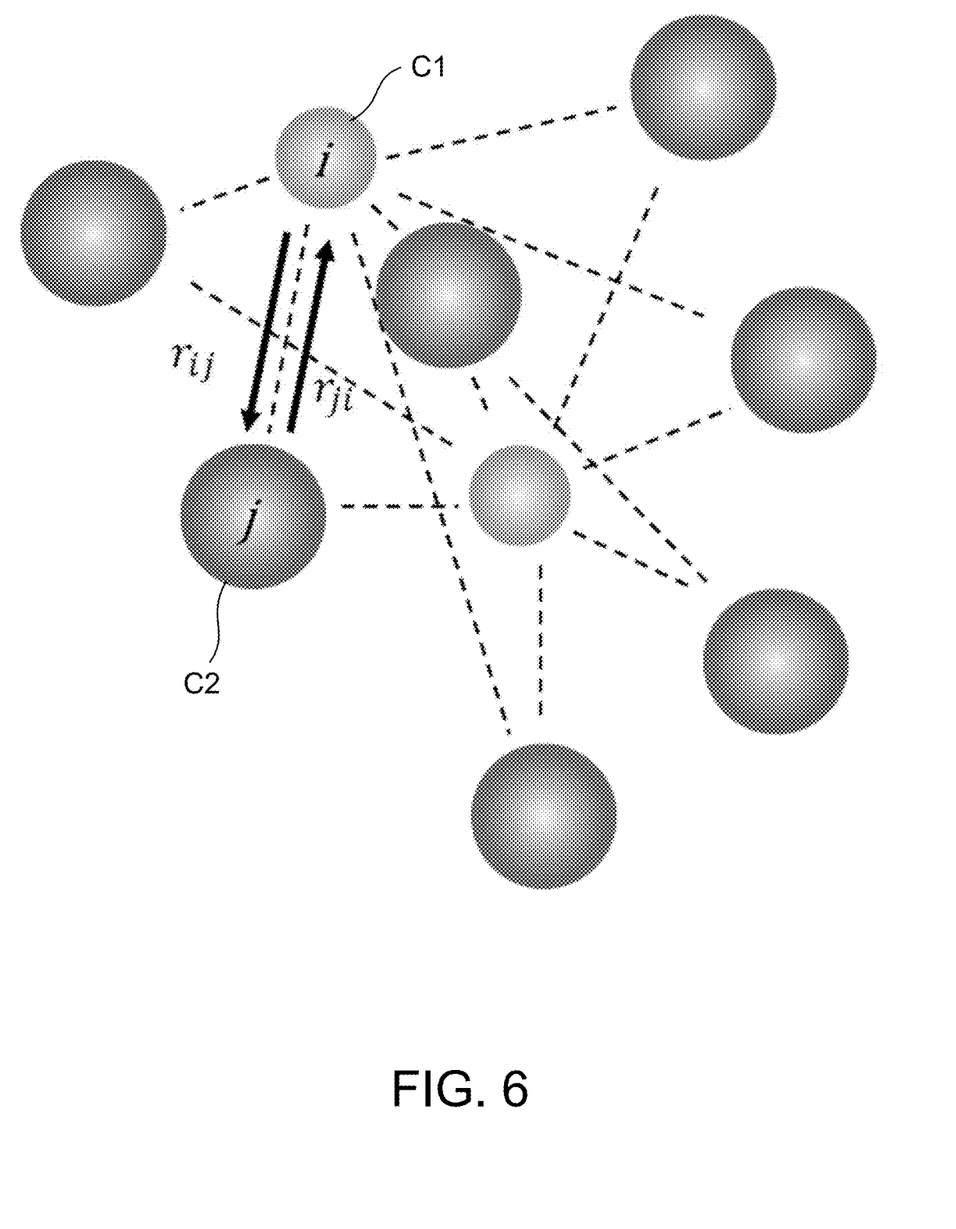
FIG. 6 shows a calculation method of colocalization between two types of cells.

Method of Calculating Colocalization Value; FIG. 6

A method of calculating colocalization values of value pins in the colocalization analysis is described. The CPU 32 scans the entire cell image IM1 with a specific area of interest. Here, the specific area of interest is, for example, the area indicated by the broken line in FIG. 2 and is a square of N×N pixels as in FIG. 3. The value for N is set, for example, by the user. Further, the specific area of interest is not limited to a square but may be, for example, a rectangle.

For example, it is assumed that the specific area of interest is located in the broken line III in FIG. 2 in the scanning of the cell image IM1. In this case, M2 target cell objects are indicated by M2 matching pins in FIG. 3. The "M2" is an integer equal to or smaller than the M1.

FIG. 6 is a schematic diagram of the M2 target cell objects in the specific area of interest. FIG. 6 shows that M2 cells indicated by the M2 target cell objects include the first-type cells C1 and the second-type cells C2 but do not include the other types of cells. In this case, the CPU 32 uses the formula below to calculate a colocalization value $I_2$ between the cells of different types for the M2 target cell objects in the specific area of interest.

$$I_2 = k_c \sum_i \sum_j \frac{P_i P_j}{r_{ij} r_{ji}} \quad (2)$$

$P_i$ is the matching rate of an $i^{th}$ first-type cell C1, and $P_j$ is the matching rate of a $j^{th}$ second-type cell C2. i, j are integers equal to or greater than 1. In the present case, the M2 is the sum of the maximum value of i and the maximum value of j. $r_{ij}$ is a vector from the $i^{th}$ cell C1 to the $j^{th}$ cell C2, and $r_{ji}$ is a vector from the $j^{th}$ cell C2 to the $i^{th}$ cell C1. The coefficient kc is predetermined, for example, with consideration to the layout of the M2 target cell objects, etc. As shown in the formula (2) above, the CPU 32 calculates values I according to the formula (1) above for all combinations of the M2 target cell objects (i.e., object groups) in the specific area of interest, and calculates a colocalization value $I_2$ in the specific area of interest as the sum of all the calculated values I.

Figure 7:
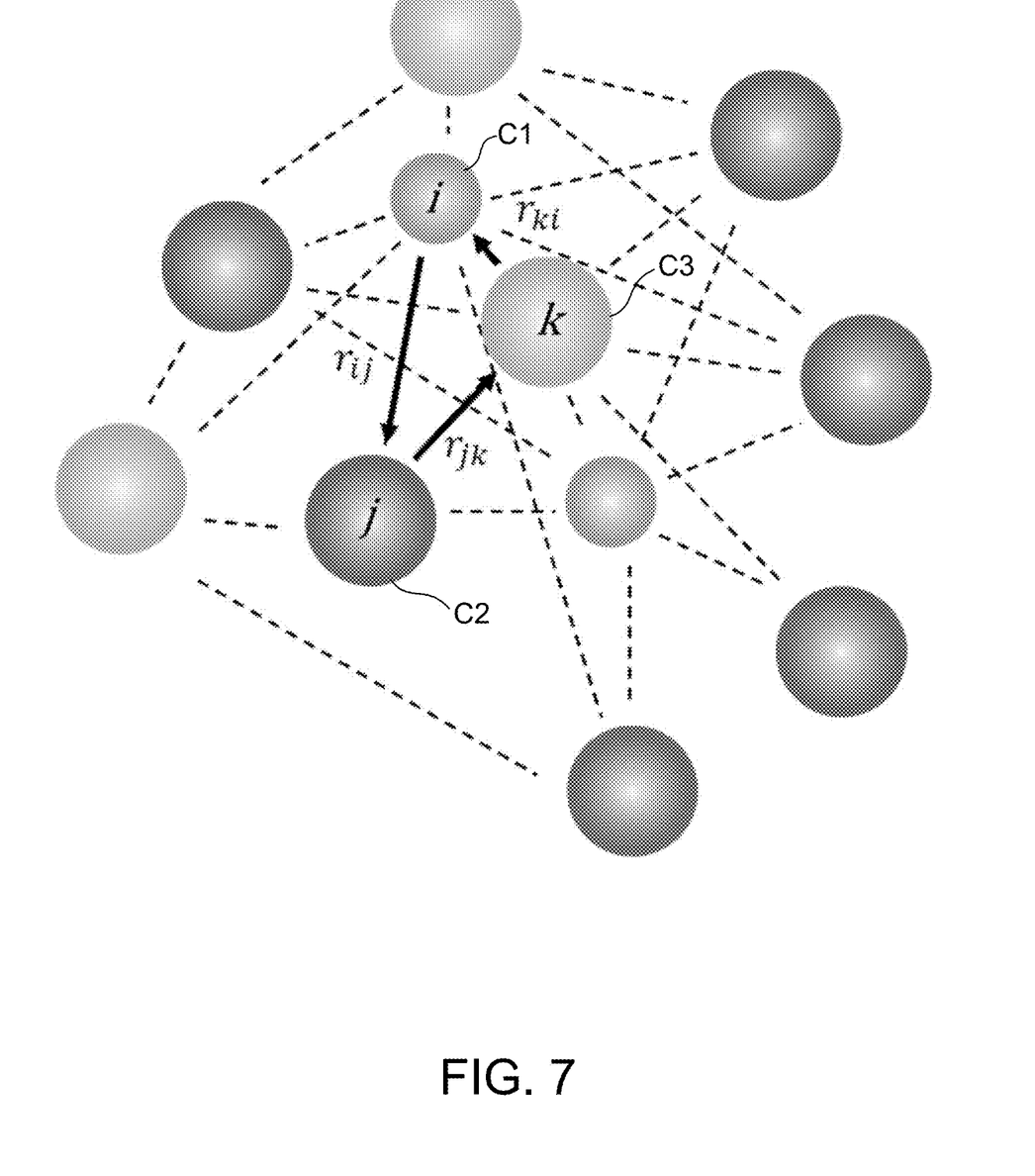
FIG. 7 shows a calculation method of colocalization between three types of cells.

Method of Calculating Colocalization Value; FIG. 7

FIG. 7 shows that M2 cells indicated by M2 target cell objects include first-type cells C1, second-type cells C2, and third-type cells C3 but do not include the other types of cells. In this case, the CPU 32 uses the formula below to calculate a colocalization value $I_3$ between the cells of different types for the M2 target cell objects in the specific area of interest.

$$I_3 = k_c \sum_i \sum_j \sum_k \frac{P_i P_j P_k}{r_{ij} r_{jk} r_{ki}} \quad (3)$$

$P_k$ is the matching rate of a $k^{th}$ third-type cell C3. k is an integer equal to or greater than 1. In the present case, the M2 is the sum of the maximum value of i, the maximum value of j, and the maximum value of k. $r_{jk}$ is a vector from the $j^{th}$ cell C2 to the $k^{th}$ cell C3, and $r_{kj}$ is a vector from the $k^{th}$ cell C3 to the $i^{th}$ cell C1. By the formula (3), a colocalization value $I_3$ in the specific area of interest is calculated.

According to the configuration of the present embodiment, as shown in the formula (1) above, the colocalization value can be calculated with consideration to a phenomenon that a degree of colocalization between cells changes in inverse proportion to square of distance. Further, as shown in the formulas (2) to (3) above, the colocalization value between cells can be calculated with consideration to all the M2 target cell objects in the specific area of interest. Moreover, as shown in the formulas (2) to (3) above, not only the colocalization value between two types of cells but also the colocalization value between three types of cells can be calculated. It should be noted that a colocalization value between four or more types of cells can be also calculated by developing the formula (3) above, although this is not shown. Through the formulas (2) to (3) above, the colocalization value between the M2 cells is calculated with consideration to the colocalization between the cells of different types in the specific area of interest. In a variant, the colocalization value between the M2 cells may be calculated with consideration to colocalization between cells of the same type (e.g., colocalization between the $i^{th}$ cell C1 and a $(i+1)^{th}$ cell C1) as well as the colocalization between cells of different types in the specific area of interest.

Correspondence Relationships

The image analysis device 10, the CPU 32, the memory 34, and the analysis program 42 are examples of "image analysis device", "computer", "memory", and "computer program", respectively. The plurality of predetermined types of cells, such as the lymphocyte, the macrophage, the carcinoma, etc., is an example of "predetermined one or more types of cells". The CPU 32 controlling the input unit 16, the CPU 32 executing the image matching analysis, the CPU 32 executing the localization analysis, and the CPU 32 controlling the display unit 14 are examples of "acquiring cell image data", "executing an image matching analysis", "calculating a colocalization value", and "outputting output data", respectively. The data representing the call image IM1 shown in FIG. 2 is an example of "cell image data". The data representing the image IM3 shown in FIG. 4 is an example of "output data".

The target cell object indicating a cell C1 and the target cell object indicating a cell C2 in FIG. 6 are examples of "first target cell object" and "second target cell object", respectively. $P_i$ and $P_j$ are examples of "first matching rate" and "second matching rate", respectively. $r_{ij}$ and $r_{ji}$ are examples of "first distance". $I_2$ is an example of "colocalization value". The formula (2) and kc are examples of "predetermined formula" and "coefficient", respectively.

The target cell object indicating a cell C1, the target cell object indicating a cell C2, and the target cell object indicating a cell C3 in FIG. 7 are examples of "first target cell object", "second target cell object", and "third target cell object", respectively. $P_i$, $P_j$, and $P_k$ are examples of "first matching rate", "second matching rate", and "third matching rate", respectively. $r_{ij}$, $r_{jk}$, and $r_{ki}$ are examples of "first distance", "second distance", and "third distance", respectively. $I_3$ is an example of "colocalization value". The formula (3) and kc are examples of "predetermined formula" and "coefficient", respectively.

For example, the calculation using the formula (2) may be implemented by dividing the product of $P_i$ and $P_j$ by the product of $r_{ij}$ and $r_{ji}$, or by multiplying the product of $P_i$ and $r_{ij}$ and the product of $P_j$ and $r_{ji}$. Generally speaking, the "calculating a colocalization value" suffices so long as it calculates a colocalization value using the "predetermined formula", and the method and order of the calculation are not particularly limited.

While the embodiment has been described above in detail, it is merely illustrative and places no limitation on the scope of the patent claims. The technology described in the patent claims also encompasses various changes and modifications to the specific examples described above.

(Variant 1) In the above embodiment, the image matching analysis is executed by using the CNN or the like, and the model parameters 50 of the CNN or the like are created by machine learning. In a variant, the image matching analysis may be implemented by image processing that uses predetermined image data representing a predetermined cell, without using the CNN or the like. In this variant, the image analysis device 10 may store the predetermined data used for the image processing in place of the model parameters 50.

(Variant 2) The "output data" is not limited to the value pins in FIG. 4 but may be character strings indicating colocalization values, contour lines connecting the same colocalization values, or the like.

(Variant 3) The formulas (2) to (3) above are merely examples and for example may not include the coefficient kc.

The technical elements explained in the present specification or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

REFERENCE SIGNS LIST

10: image analysis device, 12: operation unit, 16: input unit, 30: controller, 32: CPU, 34: memory, 40: OS program, 42: analysis program, 50: model parameters, C1 to C3: cells, IM1: cell image, IM2, IM3: images, MP1 to MP3: matching pins

The invention claimed is:

1. An image analysis method comprising:
acquiring cell image data acquired from a living organism;
executing an image matching analysis on the cell image data so as to specify a plurality of target cell objects matching any of predetermined one or more types of cells in a cell image represented by the cell image data, wherein in the image matching analysis, for each of the plurality of target cell objects, a position of the target cell object and a matching rate of the target cell object are specified;
calculating a colocalization value indicating colocalization between two target cell objects among the plurality of target cell objects; and
outputting output data acquired by using the colocalization value to an external,
wherein the calculating the colocalization value includes calculating the colocalization value by using a predetermined formula, and the predetermined formula represents:
a first calculation including multiplying a first matching rate specified for a first target cell object of the two target cell objects and a second matching rate specified for a second target cell object of the two target cell objects; and
a second calculation including dividing a calculated value acquired by the first calculation by a first distance squared, the first distance being a distance between a first position specified for the first target cell object and a second position specified for the second target cell object.

2. An image analysis method, comprising:
acquiring cell image data acquired from a living organism;
executing an image matching analysis on the cell image data so as to specify a plurality of target cell objects matching any of predetermined one or more types of cells from a cell image represented by the cell image data, wherein in the image matching analysis, for each of the plurality of target cell objects, a position of the target cell object and a matching rate of the target cell object are specified;
calculating a colocalization value indicating colocalization between at least three target cell objects among the plurality of target cell objects; and
outputting output data acquired by using the colocalization value to an external,
wherein the calculating the colocalization value includes calculating the colocalization value by using a predetermined formula, and the predetermined formula represents:
a first calculation including multiplying a first matching rate specified for a first target cell object of the at least three target cell objects, a second matching rate specified for a second target cell object of the at least three target cell objects, and a third matching rate specified for a third target cell object of the at least three target cell objects; and
a second calculation including dividing a calculated value acquired by the first calculation by a first distance, a second distance, and a third distance, the first distance being a distance between a first position specified for the first target cell object and a second position specified for the second target cell object, the second distance being a distance between the second position and a third position specified for the third target cell object, and the third distance being a distance between the third position and the first position.

3. An image analysis device for implementing the image analysis method according to claim 1.

4. An image analysis device for implementing the image analysis method according to claim 2.

5. A non-transitory computer-readable recording medium storing computer-readable instructions for an image analysis device for implementing the image analysis method according to claim 1.

6. A non-transitory computer-readable recording medium storing computer-readable instructions for an image analysis device for implementing the image analysis method according to claim 2.

* * * * *